United States Patent
Jelavic et al.

(10) Patent No.: US 7,096,017 B2
(45) Date of Patent: Aug. 22, 2006

(54) METHOD AND SYSTEM FOR SYNCHRONIZATION OF COMMUNICATION BETWEEN A MOBILE SUBSCRIBER AND A BASE STATION

(75) Inventors: Stanko Jelavic, Davie, FL (US); Apoorv Chaudhri, Sunrise, FL (US); Alan P. Conrad, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 238 days.

(21) Appl. No.: 10/820,919

(22) Filed: Apr. 8, 2004

(65) Prior Publication Data

US 2005/0249156 A1  Nov. 10, 2005

(51) Int. Cl.
*H04Q 7/20* (2006.01)

(52) U.S. Cl. .................. 455/434; 455/161.1; 455/515; 370/350; 370/468; 370/500; 370/503

(58) Field of Classification Search ............ 455/161.1, 455/161.2, 161.3, 434, 455, 515, 516; 370/337, 370/345, 347, 442, 468, 498, 500, 503, 509, 370/510; 375/138
See application file for complete search history.

(56) References Cited

U.S. PATENT DOCUMENTS

| 5,533,014 | A | * | 7/1996 | Willars et al. | 370/335 |
| 5,613,208 | A | * | 3/1997 | Blackman et al. | 455/434 |
| 5,883,899 | A | * | 3/1999 | Dahlman et al. | 370/468 |
| 5,896,368 | A | * | 4/1999 | Dahlman et al. | 370/335 |
| 6,088,590 | A | | 7/2000 | Anderson et al. | |
| 6,108,542 | A | * | 8/2000 | Swanchara et al. | 455/434 |
| 6,205,334 | B1 | * | 3/2001 | Dent | 455/434 |
| 6,212,173 | B1 | | 4/2001 | Lindsay et al. | |

* cited by examiner

*Primary Examiner*—William Trost
*Assistant Examiner*—James D Ewart
(74) *Attorney, Agent, or Firm*—Indira Saladi

(57) ABSTRACT

A method and system for synchronizing scan opportunities in a mobile communications system. Time slots are sent between a mobile subscriber and an associated base station wherein the mobile subscriber corresponds to a scan group. The number of time slots sent between the mobile subscriber and the associated base station is counted. Based upon the count, the scan group of the mobile subscriber, a scan rate, and a scan opportunity divisor, a scan opportunity is determined. If it is a scan opportunity, a scan is performed of a neighboring base station.

20 Claims, 3 Drawing Sheets

METHOD AND SYSTEM FOR SYNCHRONIZATION OF COMMUNICATION BETWEEN A MOBILE SUBSCRIBER AND A BASE STATION

FIELD OF THE INVENTION

The present invention relates generally to mobile subscriber communication systems and more specifically to a time division multiple access (TDMA) system.

BACKGROUND OF THE INVENTION

A mobile subscriber communication system may generally comprise a set of "mobile subscribers," typically mobile subscribers are the endpoints of a communication path, and a set of "base stations," typically stationary and the intermediaries by which a communication path to a mobile subscriber may be established or maintained. It is generally desirable in mobile subscriber communication systems to allow the rapid establishment of communication links between mobile subscribers and base stations, and rapid handoff between base stations, without errors and without inadvertently dropping the call or losing a communication link. This type of capability is generally accommodated by allowing the mobile subscriber to scan where scan means to go from listening to an associated base station to listening to a neighboring base station to determine which base station to hand off to when the need to handoff occurs. The mobile subscriber's ability to scan other base stations needs to be accommodated without affecting the mobile subscriber's ability to lose the current communication link.

Typically, an associated base station provides mobile subscribers scan opportunities for a mobile subscriber to establish a communication with other base stations and receive information relating to power estimation and signal quality estimation. Such scan opportunities are provided during times when the associated base station is not sending data or a slot assignment to the mobile subscriber. However, in order for such scan opportunities to be utilized properly, broadcast channels of the base stations surrounding the associated base station must be synchronized so that mobile subscriber scan opportunities coincide with broadcast channel transmissions. If the associated base station does not know when the mobile subscriber is scanning, the mobile subscriber may miss data or a slot assignment sent by its associated base station while it is scanning another base station. Missing data or a slot assignment wastes time slots and wastes communication bandwidth.

Therefore it would be advantageous to provide a synchronization system for base stations and mobile subscribers of a communication system whereby the mobile subscriber can scan other base stations other than the mobile subscriber's associated base station and still not miss data or slot assignments being sent to it by its associated base station. It would further be advantageous to provide a communication protocol enabling synchronization and control traffic functions, which is particularly suited to use in a time division multiple access (TDMA) environment.

BRIEF DESCRIPTION OF THE FIGURES

An exemplary embodiment of the invention is now described, by way of example only, with reference to the accompanying figures in which.

Figure 1:
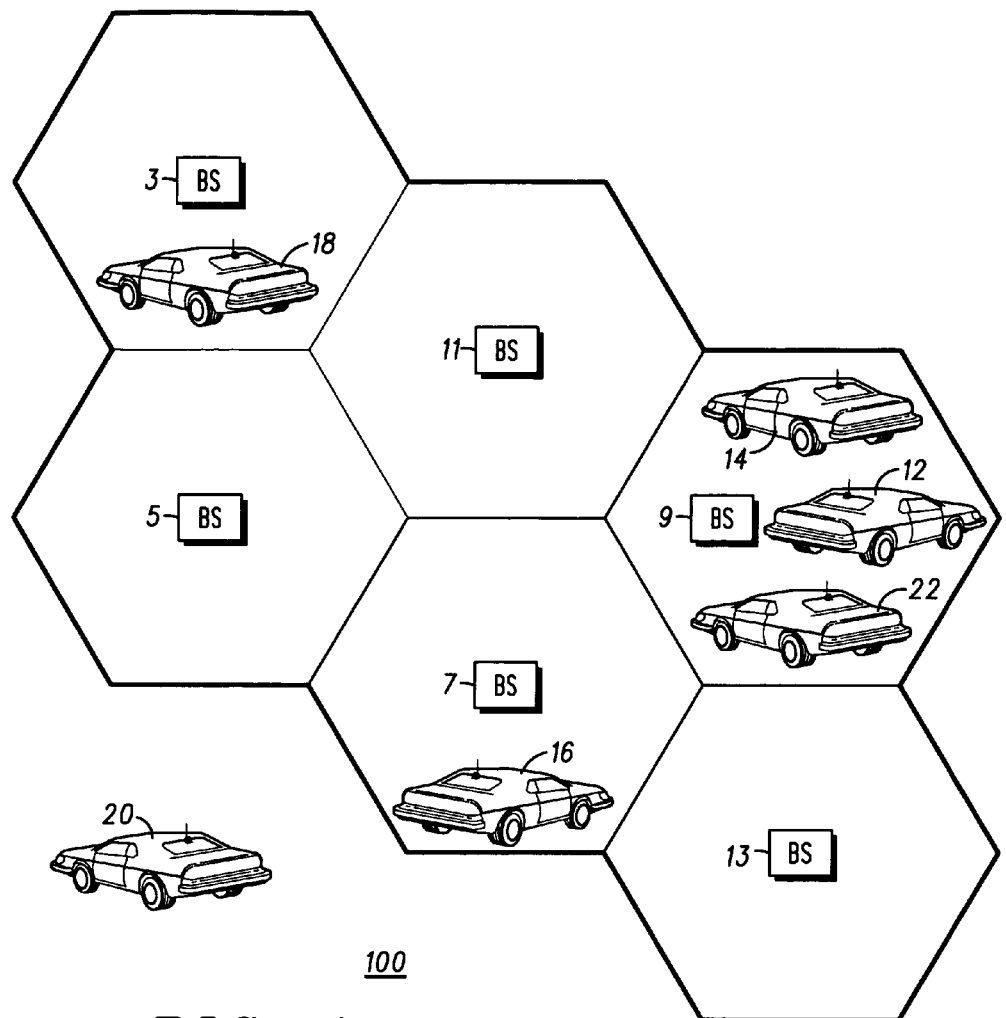
FIG. 1 is a block diagram of an example mobile communications system in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE EXEMPLARY EMBODIMENT

Referring now to FIG. 1, there is shown an example of the method and apparatus of the present invention as it may be employed and incorporated into a typical mobile subscriber communications system 100. The illustrated example comprises a plurality of cells, each with a base station 3, 5, 7, 9, 11, 13 typically located at the center of the cell, and a plurality of mobile subscribers 12, 14, 16, 18, 20, 22. The mobile subscribers 12, 14, 16, 18, 20, 22 send and receive communications with the base stations 3, 5, 7, 9, 11, 13. The mobile subscribers 12, 14, 16, 18, 20, 22 and base stations 3, 5, 7, 9, 11, 13 preferably communicate using time division multiple access (TDMA) or time division duplex (TDD) techniques as further described herein, in which specified time segments or frames are divided into assigned time slots for individual communication.

Communications initiated by a base station and sent to a mobile subscriber are termed outbound and communications initiated by a mobile subscriber and sent to a base station are termed inbound. Outbound communications include user data sent to a mobile subscriber and control information such as a slot assignment. For example, mobile subscriber 12 may receive an outbound communication from base station 9 where the outbound communication comprises transmitted data to the mobile subscriber 12. Mobile subscriber 12 may also receive an outbound communication where the base station 9 specifies that mobile subscriber 12 may use a specific inbound time slot for sending communications to the base station 9 and/or another base station, such as 7, 11, 13, that the mobile subscriber 12 wishes to communicate with. Such an outbound communication is termed a slot assignment. Further, each base station 3, 5, 7, 9, 11, 13 may maintain communication with as many mobile subscribers as there are in the base station's cell. In an exemplary embodiment, each base station 3, 5, 7, 9, 11, 13 continually transmits outbound communications to each of the mobile subscribers in the base station's cell. In an alternative embodiment, each base station 3, 5, 7, 9, 11, 13 does not continually transmit outbound communications but each base station maintains synchronized communications so that frames sent between the base station and a mobile subscriber are synchronized based upon a GPS pulse per second clocking mechanism.

Shown in FIG. 1, mobile subscriber 12 is in the cell of base station 9 and is associated with base station 9 where associated means that mobile subscriber 12 sends communications to and receives communications from base station 9 so that mobile subscriber 12 may access other parts of the mobile communications system 100. While mobile subscriber 12 is associated with base station 9, it is listening to base station 9 to receive data and slot assignments in outbound slots. The mobile subscriber 12 may need to handoff to other base stations, namely base stations 7, 11, 13, in neighboring cells if mobile subscriber 12 moves out of range of base station 9. In order to facilitate the handoff to the other base stations 7, 11, 13, mobile subscriber 12 obtains information regarding the other base stations 7, 11, 13 while it is still associated with base station 9. The time period that mobile subscriber 12 decides to scan other base stations 7, 11 is a purpose of the present invention. As used herein, the term "scan" refers to the process of a mobile subscriber listening to a base station that the mobile subscriber is not currently associated with in order to obtain information about the base station. Such information is commonly needed when making a decision in the handoff process.

Figure 2:
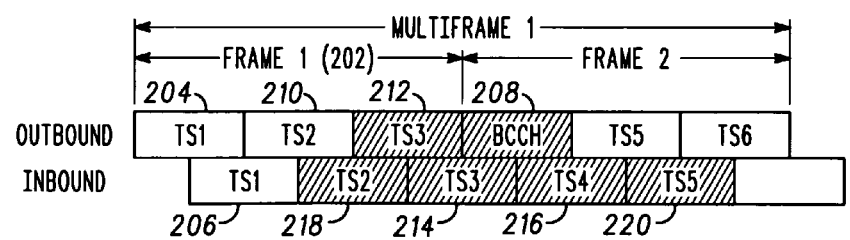
FIG. 2 is a block diagram of an example of frames in accordance with an embodiment of the invention.

As mentioned above, an exemplary embodiment of the invention achieves multiple access communication by using a time frame divided into multiple time slots. In such an embodiment, the invention utilizes TDMA for communication. Shown in FIG. 2 is a typical TDMA time slot that is grouped into frames, where in an exemplary embodiment a single frame is three time slots. Similar time slots are assumed to precede and follow time slot 204 in a continuous pattern. In an exemplary embodiment, time slots may be inbound or outbound. Outbound time slots are used by the base station for communication from the base station to a mobile subscriber. Inbound time slots are used by the mobile subscriber for communication from the mobile subscriber to the base station. In FIG. 2, each time slot is numbered consecutively TS1, TS2 . . . , TSN. Communication in time slots 204 may be interleaved, such that mobile subscribers transmit in one physical time slot, such as time slot 206, but receive in a different physical time slot, such as time slot 204.

Further, in an exemplary embodiment, each frame is concatenated to form multiframes and three frames form a single multiframe. Each multiframe is concatenated to form hyperframes and two multiframes form a single hyperframe. In such an embodiment, time frame 202 is approximately 30 milliseconds in duration, and each frame, such as 202, comprises three time slots 204. In an exemplary embodiment, each slot, whether shaded or unshaded, is approximately 10 milliseconds in duration. In an alternate embodiment, the slots may be of varying slot sizes. For example, slot 2 210 may be 10 milliseconds in duration and slot 3 212 may be 15 milliseconds in duration.

In an exemplary embodiment, outbound time slots, whether shaded or unshaded, comprise two types: 1) outbound data transfers and 2) slot assignments. Outbound data transfers are communications from the base station to the specified mobile subscriber. A slot assignment is a communication from the base station to a mobile subscriber specifying which inbound slots the mobile can use to send transmissions. For example, if the base station allows the mobile subscriber to use inbound slots 3 and 4, then mobile subscriber may transmit information to the base station in those slots. The mobile subscriber may also scan another base station during a slot assignment as long as the slot assignment is not for the mobile subscriber performing the scan.

As shown in FIG. 2, there are more inbound shaded time slots than there are outbound shaded time slots. The reason that inbound or outbound time slots are shaded is based upon characteristics of the mobile subscribers and the base stations in the mobile communications system 100. First, an outbound time slot which contains a BCCH message (as will be described below) is a target communication of the mobile subscribers so that time slot is shaded. Further, the outbound time slot before the transmission of the BCCH message is also shaded as the mobile subscriber needs time to switch from communicating with an associated base station to communicating with a neighboring base station to receive the BCCH message. Second, an inbound time slot that corresponds to an outbound time slot which contains a slot assignment for the mobile subscriber is also shaded. For example, if the base station sends a mobile subscriber a message in outbound slot 2 210 which indicates to use the next inbound slot, then inbound time slots 2 218 and 3 214 are shaded time slots because the mobile subscriber needs time to perform RF functionality including changing the mobile subscriber's receive oscillator and setting up the mobile subscriber's receiver during the last half of outbound slot 2 210 and then switch to the inbound slot 3 214 during the first half of the inbound slot 3 214 to receive the BCCH message. In an embodiment, where the mobile subscriber is a full duplex radio, the mobile subscriber may need less time than described because the RF functionality performed during the shaded time slots may not be as extensive, e.g. only the mobile subscriber's receiver switches from outbound to inbound and the mobile subscriber's transmitter is not affected.

An embodiment of the present invention takes into account the characteristics of the various mobile subscribers in the communications system 100 so that mobile subscribers that take longer to scan are given extra slots to complete the processing of scanning and mobile subscribers that do not need as much time to scan may be accommodated in one slot. Further, an alternative embodiment of the present invention communicates the transmission of the BCCH message during the middle of a time slot so that only one time slot is used for receiving the BCCH message by the mobile subscriber. For example, in such a system, the mobile subscriber may switch to an inbound time slot and receive the BCCH message in the same inbound time slot. Specifically, the mobile subscriber may switch to the inbound time slot at the beginning of the time slot and receive the BCCH message during the middle of the time slot.

In one embodiment of the present invention, scan opportunities for a mobile subscriber may take place based upon a specific identification number named a Subscriber Access Code (SAC). Each mobile subscriber has a corresponding SAC, which is associated with a particular base station and the mobile subscribers are divided into scan groups for scanning purposes. The correspondence between mobile subscribers and scan groups is made by utilizing the SAC. For example, a mobile subscriber with a SAC of 250 may be assigned to scan group 0. In an exemplary embodiment, evenly distributing mobile subscribers between the available scan groups of the system 100 is ideal. For example, allocating a mobile subscriber with an SAC 0 to scan group 0, a mobile subscriber with a SAC 256 to scan group 1, and so on so as to evenly distribute all mobile subscriber of the system 100 between the available scan groups is ideal. Mobile subscribers with similar scan time and other requirements may be grouped together in a single scan group. In an exemplary embodiment, sixteen scan groups are assigned as in Table 1.

TABLE 1

| Scan Group | SAC Range |
|---|---|
| 0 | 0–255 |
| 1 | 256–511 |
| 2 | 512–767 |
| 3 | 768–1023 |
| 4 | 1024–1279 |
| 5 | 1280–1535 |
| 6 | 1536–1791 |
| 7 | 1792–2047 |
| 8 | 2048–2303 |
| 9 | 2304–2559 |
| 10 | 2560–2815 |
| 11 | 2816–3071 |
| 12 | 3072–3327 |
| 13 | 3328–3583 |
| 14 | 3584–3839 |
| 15 | 3840–4094 |

Having a mobile subscriber communications system 100 with 16 scan groups as shown in the above table is only an example. As is known to one of ordinary skill in the art, the number of scan groups may vary depending upon various characteristics of the mobile subscriber communications system 100 including the number of mobile subscribers in the system 100, the frequency of scan opportunities, the characteristics of the mobile subscribers, and other factors as described through out this application. For example, in an alternative embodiment, the scan group may be based upon other types of radio identifiers including a working unit ID.

Regardless of how the mobile subscriber is assigned to a scan group, the mobile subscriber performs scanning of base stations based upon the scan group that the mobile subscriber is associated with. Based upon the corresponding scan group, both the base station and the mobile subscriber know that when a scan opportunity arises, the mobile subscriber can go and scan other base stations, where a scan opportunity is a shaded time slot as shown in FIG. 2. Further, the base station knows that during shaded time slots, the mobile subscriber is unavailable and therefore the base station should not transmit data or slot assignments to the mobile subscriber.

In one embodiment of the present invention, scan opportunities for a mobile subscriber may take place based upon the messaging that takes place between the mobile subscriber and the base station. Specifically, the mobile subscriber and base station may keep track of the number of slots that have been communicated and decide that certain slots are designated as scan opportunities. In an exemplary embodiment of the invention, scan opportunities may occur based upon a combination of the number of frames, multiframes, and hyperframes that have been sent between the base station and the mobile subscriber since the last scan opportunity.

In an alternative embodiment, a base station may send updates regarding the current framing in the header of a message sent in a time slot. In such an embodiment, the mobile subscriber does not have to keep count of the number of time slots, frames, multiframes, and hyperframes that have been sent to the mobile subscriber from the base station. Based upon the information in the header, the mobile subscriber can decide whether it is a scan opportunity for the mobile subscriber's scan group.

Figure 3:
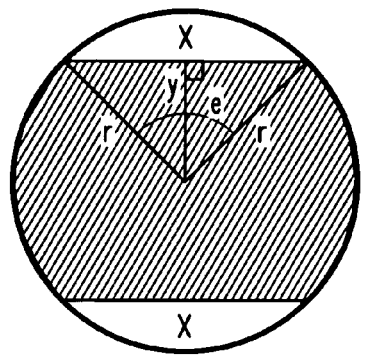
FIG. 3 is a simplified block diagram of a typical coverage area for a mobile subscriber of FIG. 1.

In one embodiment of the present invention, scan opportunities for a mobile subscriber may take place based upon a scan opportunity divisor. The base station sends a message to mobile subscribers associated with the base station to scan at an interval set by the scan opportunity divisor. The scan opportunity divisor is related to a scan interval between two scan opportunities. Specifically, the scan opportunity divisor sets a rate at which a base station provides scan opportunities to mobile subscribers and is related to a coverage area of a cell site in the mobile communications system 100, the time for a mobile subscriber to travel through the cell site, the number of base stations to be scanned, and the number of measurements that need to be taken at each base station. As shown in FIG. 3, assuming that a typical cell is 10 miles, a mobile subscriber traveling at 60 miles per hour where the mobile communications system 100 utilizes 150 kHz channels, and a requirement to scan 15 base stations five times, the following mathematical description exemplifies the calculation of a scan interval. Given that the shaded area in FIG. 3 represents 90% of the coverage of the cell and X represents the minimum distance that a mobile subscriber can travel through the cell and still be within the 90% coverage area, calculating X is found as follows.

$$X = 2r\sin\frac{\theta}{2} \qquad (1)$$

The radius of the cell is assumed to be half the diameter of the cell where the diameter is 10 miles. The only unknown in the above equation is θ which is found as follows.

$$Area_{circle\ segment} = \frac{\theta}{2}r^2$$

Since the unshaded area in FIG. 3 represents 10% of the total area, the formula may be adjusted as follows.

$$0.1\pi r^2 = 2 \times \frac{\theta}{2}r^2 - 2 \times \frac{1}{2}XY, \text{ where } Y = \cos\frac{\theta}{2}$$

Simplifying, $$0.1\pi r^2 = \theta r^2 - 2r^2\sin\frac{\theta}{2}\cos\frac{\theta}{2}$$

Simplifying further and applying property sin 2θ=2 sin θ cos θ yields:

0.1π=θ−sin θ

Solving for θ results in the following.

θ≅1.268948 radians

Plugging θ and r=5 miles into equation (1) yields an X value as follows.

X=5.928 miles

Based upon this result, if the mobile subscriber is traveling at 60 miles an hour, the mobile subscriber station will travel 5.928 miles in approximately 6 minutes. The number of base stations that the mobile subscriber needs to scan affects how many times and how often the mobile subscriber can scan during that time. For an arbitrary system where the mobile subscriber needs to scan 15 base stations during the approximately 6 minutes, the mobile subscriber needs to scan approximately every 4.8 seconds in order to scan the 15 base stations five times each before leaving the cell of the arbitrary system. In such an embodiment, the scan interval is set to be 4.8 seconds. In an exemplary embodiment, the scan interval is chosen to be 5.12 seconds. Since the scan interval is slightly larger than 4.8 seconds, the mobile subscriber must be within slightly less than 90% of the cell coverage area in order to scan 15 neighbor cells five times each.

For a scan interval of 5.12 seconds, the scan opportunity divisor may be set to one. The base station sends a message regarding the scan opportunity divisor value of one to mobile subscribers associated with the base station to scan neighboring base stations every 5.12 seconds. In an alternate embodiment, the base station sends a message regarding the scan opportunity divisor only to mobile subscriber's in a particular scan group. In another alternate embodiment, the scan opportunity divisor may be changed dynamically. The mobile subscriber may send a message to the base station to request a change of the scan opportunity divisor. Further, the base station may send a message to the mobile subscriber to request a change of the scan opportunity divisor.

In yet another alternate embodiment, the scan opportunity divisor is associated with a scan group. The scan opportunity divisor may be the same for each scan group or it may vary according to the scan group. For example, where the mobile subscribers are all from the same manufacturer and of similar quality, the scan opportunity divisor may be set the same for those mobile subscribers and further those mobile subscribers may be members of the same group. In another example, if mobile subscribers in a particular group need to have more scan opportunities then the scan opportunity divisor for that group may be set to a time that allows for those mobile subscribers to scan more frequently than mobile subscribers in other groups. An example is where a mobile subscriber may need to have more scan opportunities because the mobile subscriber needs to scan a large number of base stations, e.g. ten or more base stations. Another mobile subscriber may not need a large scan opportunity divisor because it may be allowed to only use a small number of base stations, e.g. two or three base stations, and so the mobile subscriber does not need much time to scan those two or three base stations.

In an exemplary embodiment of the present invention, scan opportunities for a mobile subscriber take place based upon a relationship between the framing, the scan group, a scan rate, and the scan opportunity divisor. The mobile subscriber keeps track of the number of slots received from the mobile subscriber's associated base station and recalculates whether the mobile subscriber has a scan opportunity based upon an equation. For example, if the mobile subscriber has received three time slots, then the mobile subscriber knows that it is now a new frame and increments a count of frames. An exemplary embodiment of the relationship can be described mathematically as follows.

$$\text{Scan Opportunity} = |\text{Frame} - \text{Scan Group}| \% \frac{\text{Scan Rate}}{\text{Scan Opportunity Divisor}} \quad (2)$$

When Equation 2 equates to zero, a scan opportunity for the mobile subscriber has arrived.

In Equation 2 the scan rate represents how often groups of mobile subscribers will be given a scan opportunity. In an exemplary embodiment, the scan rate represents the number of scan groups in the mobile communications system 100. For example, if there are sixteen scan groups, then the scan rate may be set to sixteen. By setting the scan rate to sixteen, each scan group of the sixteen scan groups will scan once every sixteen frames. In an alternate embodiment, the scan rate represents a maximum length of time before a scan group opportunity arrives.

In an exemplary embodiment, the scan rate is chosen to be sixteen and represents the number of scan groups in the system. Thus, at a minimum, each scan group of the sixteen scan groups will have scanned once every sixteen frames. In such an embodiment, Equation 2 is simplified as follows.

$$\text{Scan Opportunity} = |\text{Frame} - \text{Scan Group}| \% \frac{16}{\text{Scan Opportunity Divisor}} \quad (3)$$

In a specific example, where if there are two scan groups and eight scan opportunities, then Equation 3 will evaluate to zero every other frame. Thus, starting at frame 2 and continuing, every even frame will signal a scan opportunity. Thus, the mobile subscriber of the scan group that has a scan opportunity may go and scan neighboring base stations. In an exemplary embodiment, the length of the scan opportunity is configurable. In an exemplary embodiment and shown in FIG. 2, the length of the scan opportunity is one outbound time slot or approximately 10 milliseconds. Both the base stations and the mobile subscribers in the mobile communications system 100 have knowledge of Equation 2 or in an exemplary embodiment, both the base stations and the mobile subscribers in mobile communications system 100 have knowledge of Equation 3. For example, knowledge of Equation 2 or Equation 3 may require that software in the mobile subscriber and the base station are programmed to evaluate the corresponding equation.

In an exemplary embodiment, Equation 2 is evaluated on a frame basis. Thus, at the beginning of a new frame, the mobile subscriber evaluates Equation 2 to determine whether the mobile subscriber has a scan opportunity. In an alternate embodiment, the mobile subscriber may evaluate Equation 2 on a slot basis instead of on a frame basis. In any case, mobile subscribers in mobile communications system 100 are keeping track of the number of frames, multiframes, and hyperframes received from the associated base station. In an alternate embodiment, the base stations and mobile subscribers in the mobile communications system 100 compute the number of time slots between scan opportunities using Equation 2 once, e.g. when the scan opportunity divisor and scan group is set in the mobile subscriber. Subsequently, the base stations and the mobile subscribers in the mobile communications system 100 count the number of time slots between scan opportunities. Such an implementation may decrease the computation associated with synchronizing the scan opportunities between base stations and mobile subscribers in the mobile communications system 100.

Equation 2 further specifies that all mobile subscribers of a particular scan group will have a scan opportunity during the current frame. In an exemplary embodiment, scan opportunities span multiple frames. For example, shown in FIG.

2 is a scan opportunity that begins at the end of Frame 1 and continues to Frame 2. Therefore, when Equation 2 evaluates to zero, the scan opportunity begins on the last outbound slot of the current frame and includes the first slot of the next frame. Specifically, for a scan group value of ten and a scan opportunity divisor of one, when the frame value is equal to 26, a scan opportunity has arrived for mobile subscribers in scan group ten, i.e. Equation 2 has evaluated to zero. Consequently, the inbound slots shown shaded in FIG. 2 will not be assigned to any mobile subscriber that is part of scan group ten.

In an exemplary embodiment, each base station 3, 5, 7, 9, 11, 13 sends a broadcast control channel (BCCH) message to the mobile subscribers 12, 14, 16, 18, 20, 22. Typically, the BCCH message comprises information relating to link quality of a base station, the current slot, frame, multiframe, hyperframe number and the scan opportunity divisor. The BCCH message may also comprise information relating to a mobile subscriber's scan group but such information is normally programmed into the mobile subscriber and communicated to a base station. Even if the BCCH message comprises the mobile subscriber's scan group, such information does not indicate whether the current or next scan opportunity is for the mobile subscriber's scan group as scan opportunities are determined by evaluating Equation 2 and not solely based upon the mobile subscriber's scan group. The BCCH message is sent from a base station to a mobile subscriber in a time slot, such as 208. The BCCH message has other information that a mobile subscriber utilizes to determine which neighboring base stations of the mobile subscriber are suitable candidates for the mobile subscriber to handoff to. Further, in an exemplary embodiment, all the base stations 3, 5, 7, 9, 11, 13 in the mobile communications system 100 transmit a BCCH message at the same time.

In an alternate embodiment, every BCCH message is broken up into multiple time slots. For example, if the BCCH message is separated into three time slots, the mobile subscriber may want to read the BCCH message from the mobile subscriber's associated base station, then scan to a neighboring base station and read the BCCH message from the neighboring base station. Then, the mobile subscriber may scan to a second neighboring base station and read the BCCH message from the second neighboring base station. In yet another alternate embodiment, determining which base station the mobile subscriber should scan could be made in a round robin fashion. For example, as shown in FIG. 1, mobile subscriber 12 could scan base station 7, base station 11, and then base station 13. The determination could also be an ad-hoc determination. For example, mobile subscriber 12 could scan base station 7 more often because the mobile station 12 has information that base station 7 is more preferential than other neighboring base stations 11, 13.

In a specific example, looking at FIG. 2, assuming that slot 1 is the start of a frame, namely Frame 1, and slot 4 is the start of another frame, namely Frame 2, the mobile subscriber may know that based on Equation 2, the mobile subscriber can scan neighboring base stations at the beginning of Frame2. The mobile subscriber sequentially processes time slot 1, time slot 2, and then time slot 3. At the time of slot 4, the mobile subscriber knows that it can go and scan neighboring base stations. The mobile subscriber knows that it's associated base station will not send it any data or slot assignments during time slot 3 or time slot 4 because the associated base station knows of Equation 2 and is keeping track of the frames, scan group, and scan opportunity divisor just as the mobile subscriber is keeping track of the same information. During time slot 3, the mobile subscriber is changing his frequency oscillators and setting his RF hardware in preparation to scan neighboring base stations. Thus, at the beginning of time slot 4, the mobile subscriber is listening to a neighboring base station and receiving a BCCH message from a neighboring base station and receiving information that the mobile subscriber needs in order to make a link quality determination. Then, the mobile subscriber needs to go back to the mobile subscriber's associated base station before the beginning of time slot 6 so that the mobile subscriber will not miss either data or slot assignments from the mobile subscriber's associated base station. The process repeats with the mobile subscriber keeping track of frames until the next opportunity arrives to go scan.

Shown in the following tables are various examples of scan opportunities or calculations utilizing Equation 3 for different values of the frame, the scan group where there are sixteen scan groups, and scan opportunity divisor. In an exemplary embodiment, the scan opportunities are periodic as shown in the following tables. The tables show specific embodiments of the invention for a mobile communications system 100. If the mobile communications system 100 utilizes channels of smaller bandwidths like 25 kHz or 50 kHz then the scan opportunities may be less often as the coverage area is bigger.

For example shown in Table 3, where the scan opportunity divisor is equal to one, a mobile subscriber in scan group 0 will have a scan opportunity at frames 0, 16, 32, and 48.

TABLE 2

X = 1 scan interval = 5.12 , % out bound char = 0.391 % inbound char = 0.781

Hyperframe/Multiframe/Frame Number

|  |  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|----|----|----|----|----|----|----|----|----|----|----|----|----|----|----|----|
| Scan | 0 | ✓ |  |  |  |  |  |  |  |  |  |    |    |    |    |    |    | ✓  |    |    |    |    |    |    |    |    |    |
| Group | 1 |  | ✓ |  |  |  |  |  |  |  |  |    |    |    |    |    |    |    | ✓  |    |    |    |    |    |    |    |    |
|  | 2 |  |  | ✓ |  |  |  |  |  |  |  |    |    |    |    |    |    |    |    | ✓  |    |    |    |    |    |    |    |
|  | 3 |  |  |  | ✓ |  |  |  |  |  |  |    |    |    |    |    |    |    |    |    | ✓  |    |    |    |    |    |    |
|  | 4 |  |  |  |  | ✓ |  |  |  |  |  |    |    |    |    |    |    |    |    |    |    | ✓  |    |    |    |    |    |
|  | 5 |  |  |  |  |  | ✓ |  |  |  |  |    |    |    |    |    |    |    |    |    |    |    | ✓  |    |    |    |    |
|  | 6 |  |  |  |  |  |  | ✓ |  |  |  |    |    |    |    |    |    |    |    |    |    |    |    | ✓  |    |    |    |
|  | 7 |  |  |  |  |  |  |  | ✓ |  |  |    |    |    |    |    |    |    |    |    |    |    |    |    | ✓  |    |    |
|  | 8 |  |  |  |  |  |  |  |  | ✓ |  |    |    |    |    |    |    |    |    |    |    |    |    |    |    | ✓  |    |
|  | 9 |  |  |  |  |  |  |  |  |  | ✓ |    |    |    |    |    |    |    |    |    |    |    |    |    |    |    | ✓ |
|  | 10 |  |  |  |  |  |  |  |  |  |  | ✓ |    |    |    |    |    |    |    |    |    |    |    |    |    |    |    |

TABLE 2-continued

X = 1 scan interval = 5.12 , % out bound char = 0.391 % inbound char = 0.781

|  | Hyperframe/Multiframe/Frame Number | | | | | | | | | | | | | | | | | | | | | | | | | |
|---|---|---|---|---|---|---|---|---|---|---|---|---|---|---|---|---|---|---|---|---|---|---|---|---|---|---|
| Scan Group | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 11 | | | | | | | | | | | | ✓ | | | | | | | | | | | | | | |
| 12 | | | | | | | | | | | | | ✓ | | | | | | | | | | | | | |
| 13 | | | | | | | | | | | | | | ✓ | | | | | | | | | | | | |
| 14 | | | | | | | | | | | | | | | ✓ | | | | | | | | | | | |
| 15 | | | | | | | | | | | | | | | | ✓ | | | | | | | | | | |

|  | Hyperframe/Multiframe/Frame Number | | | | | | | | | | | | | | | | | | | | | | | | | |
|---|---|---|---|---|---|---|---|---|---|---|---|---|---|---|---|---|---|---|---|---|---|---|---|---|---|---|
| Scan Group | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
| 0 | | | | | | | ✓ | | | | | | | | | | | | | | | | ✓ | | |
| 1 | | | | | | | | ✓ | | | | | | | | | | | | | | | | ✓ | |
| 2 | | | | | | | | | ✓ | | | | | | | | | | | | | | | | ✓ |
| 3 | | | | | | | | | | ✓ | | | | | | | | | | | | | | | |
| 4 | | | | | | | | | | | ✓ | | | | | | | | | | | | | | |
| 5 | | | | | | | | | | | | ✓ | | | | | | | | | | | | | |
| 6 | | | | | | | | | | | | | ✓ | | | | | | | | | | | | |
| 7 | | | | | | | | | | | | | | ✓ | | | | | | | | | | | |
| 8 | | | | | | | | | | | | | | | ✓ | | | | | | | | | | |
| 9 | | | | | | | | | | | | | | | | ✓ | | | | | | | | | |
| 10 | ✓ | | | | | | | | | | | | | | | | ✓ | | | | | | | | |
| 11 | | ✓ | | | | | | | | | | | | | | | | ✓ | | | | | | | |
| 12 | | | ✓ | | | | | | | | | | | | | | | | ✓ | | | | | | |
| 13 | | | | ✓ | | | | | | | | | | | | | | | | ✓ | | | | | |
| 14 | | | | | ✓ | | | | | | | | | | | | | | | | ✓ | | | | |
| 15 | | | | | | ✓ | | | | | | | | | | | | | | | | ✓ | | | |

In another example shown in Table 4, where the scan opportunity is equal to two, a mobile subscriber in scan group 0 will have a scan opportunity at frames 0, 8, 16, 24, 32, 40, and 48.

TABLE 3

X = 2 scan interval = 2.56 , % out bound char = 0.781 % inbound char = 1.563

|  | Hyperframe/Multiframe/Frame Number | | | | | | | | | | | | | | | | | | | | | | | | | |
|---|---|---|---|---|---|---|---|---|---|---|---|---|---|---|---|---|---|---|---|---|---|---|---|---|---|---|
| Scan Group | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| 0 | ✓ | | | | | | | | ✓ | | | | | | | | ✓ | | | | | | | | ✓ | |
| 1 | | ✓ | | | | | | | | ✓ | | | | | | | | ✓ | | | | | | | | ✓ |
| 2 | | | ✓ | | | | | | | | ✓ | | | | | | | | ✓ | | | | | | | |
| 3 | | | | ✓ | | | | | | | | ✓ | | | | | | | | ✓ | | | | | | |
| 4 | | | | | ✓ | | | | | | | | ✓ | | | | | | | | ✓ | | | | | |
| 5 | | | | | | ✓ | | | | | | | | ✓ | | | | | | | | ✓ | | | | |
| 6 | | | | | | | ✓ | | | | | | | | ✓ | | | | | | | | ✓ | | | |
| 7 | | | | | | | | ✓ | | | | | | | | ✓ | | | | | | | | ✓ | | |
| 8 | ✓ | | | | | | | | ✓ | | | | | | | | ✓ | | | | | | | | ✓ | |
| 9 | | ✓ | | | | | | | | ✓ | | | | | | | | ✓ | | | | | | | | ✓ |
| 10 | | | ✓ | | | | | | | | ✓ | | | | | | | | ✓ | | | | | | | |
| 11 | | | | ✓ | | | | | | | | ✓ | | | | | | | | ✓ | | | | | | |
| 12 | | | | | ✓ | | | | | | | | ✓ | | | | | | | | ✓ | | | | | |
| 13 | | | | | | ✓ | | | | | | | | ✓ | | | | | | | | ✓ | | | | |
| 14 | | | | | | | ✓ | | | | | | | | ✓ | | | | | | | | ✓ | | | |
| 15 | | | | | | | | ✓ | | | | | | | | ✓ | | | | | | | | ✓ | | |

|  | Hyperframe/Multiframe/Frame Number | | | | | | | | | | | | | | | | | | | | | | | | | |
|---|---|---|---|---|---|---|---|---|---|---|---|---|---|---|---|---|---|---|---|---|---|---|---|---|---|---|
| Scan Group | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
| 0 | | | | | | | ✓ | | | | | | | | ✓ | | | | | | | | ✓ | | |
| 1 | | | | | | | | ✓ | | | | | | | | ✓ | | | | | | | | ✓ | |
| 2 | ✓ | | | | | | | | ✓ | | | | | | | | ✓ | | | | | | | | ✓ |
| 3 | | ✓ | | | | | | | | ✓ | | | | | | | | ✓ | | | | | | | |
| 4 | | | ✓ | | | | | | | | ✓ | | | | | | | | ✓ | | | | | | |
| 5 | | | | ✓ | | | | | | | | ✓ | | | | | | | | ✓ | | | | | |
| 6 | | | | | ✓ | | | | | | | | ✓ | | | | | | | | ✓ | | | | |
| 7 | | | | | | ✓ | | | | | | | | ✓ | | | | | | | | ✓ | | | |
| 8 | | | | | | | ✓ | | | | | | | | ✓ | | | | | | | | ✓ | | |
| 9 | | | | | | | | ✓ | | | | | | | | ✓ | | | | | | | | ✓ | |
| 10 | ✓ | | | | | | | | ✓ | | | | | | | | ✓ | | | | | | | | ✓ |
| 11 | | ✓ | | | | | | | | ✓ | | | | | | | | ✓ | | | | | | | |

TABLE 3-continued

X = 2 scan interval = 2.56 , % out bound char = 0.781 % inbound char = 1.563

|    | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| 12 | ✓ |   |   |   | ✓ |   |   |   | ✓ |   |    |    |    |    |    |    |
| 13 |   | ✓ |   |   |   | ✓ |   |   |   | ✓ |    |    |    |    |    |    |
| 14 |   |   | ✓ |   |   |   | ✓ |   |   |   | ✓  |    |    |    |    |    |
| 15 |   |   |   | ✓ |   |   |   | ✓ |   |   |    | ✓  |    |    |    |    |

In yet another example shown in Table 5, where the scan opportunity is equal to 15, a mobile subscriber in scan group 0 will have a scan opportunity at frames 0, 2, 4, 6, 8, 10, 12, and so on.

TABLE 4

X = 15 scan interval = 0.64 , % out bound char = 3.125 % inbound char = 6.25

Hyperframe/Multiframe/Frame Number

| Scan Group | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| 0  | ✓ |   | ✓ |   | ✓ |   | ✓ |   | ✓ | ⑦ | ⑦ | ⑦ | ⑦ | ⑦ | ⑦ | ⑦ | ⑦ | ⑦ | ✓ |   | ✓ |   | ✓ |   | ✓ |   |
| 1  |   | ✓ |   | ✓ |   | ✓ |   | ✓ |   | ⑦ | ⑦ | ⑦ | ⑦ | ⑦ | ⑦ | ⑦ | ⑦ | ⑦ |   | ✓ |   | ✓ |   | ✓ |   | ✓ |
| 2  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 3  |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 4  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 5  |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 6  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 7  |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 8  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 9  |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 10 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 11 |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 12 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 13 |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 14 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 15 |   | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |

| Scan Group | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| 0  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 1  |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 2  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 3  |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 4  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 5  |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 6  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 7  |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 8  | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 9  |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 10 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 11 |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 12 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 13 |   | ✓ |   | ✓ |   | ✓ |   | ✓ |   | ✓ |   | ✓ |   | ✓ |   | ✓ |   | ✓ |   | ✓ |   | ✓ |   | ✓ |   |
| 14 | ✓ |   | ✓ |   | ✓ |   | ✓ |   | ✓ |   | ✓ |   | ✓ |   | ✓ |   | ✓ |   | ✓ |   | ✓ |   | ✓ |   | ✓ |
| 15 |   | ✓ |   | ✓ |   | ✓ |   | ✓ |   | ✓ |   | ✓ |   | ✓ |   | ✓ |   | ✓ |   | ✓ |   | ✓ |   | ✓ |   |

For a specific example of the invention where there are 32 slots in one frame, each slot is 10 milliseconds, and the scan rate is chosen to be 16 frames, varying the scan opportunity divisor yields the scan intervals as shown in Table 2. The scan interval values in Table 2 are derived by using Equation 2 and substituting the appropriate values for Frame, Scan Rate, and Scan Opportunity Divisor. For example, for a scan opportunity divisor of 1, a scan interval is calculated as follows and mathematically describes that a scan opportunity occurs every 16 frames or every 5.12 sec.

$$\text{Scan Interval (sec)} = |(32 \text{ frames/time slot})(10 \text{ ms}) - \text{Scan Group}|$$
$$\% \frac{16 \text{ frames}}{1}$$
$$= 5.12 \text{ sec}$$

If the scan opportunity dvisor is 2, then the scan interval is calculated as follows and mathematically describes that a scan opportunity occurs every 8 frames or every 2.56 sec.

$$\text{Scan Interval (sec)} = |(32 \text{ frames/time slot})(10 \text{ ms}) - \text{Scan Group}|$$
$$\% \frac{16 \text{ frames}}{2}$$
$$= 2.56 \text{ sec}$$

Notice, that the scan interval for scan opportunity divisors 8 through 15 are the same. Because the scan interval is based upon a modulo ratio of the scan rate and the scan opportunity divisor, if the ratio of the two numbers evaluates to a fractional number, then the ratio of the two numbers is rounded to the next highest interger. For example, if the scan opportunity divisor is 13, then, the ratio of scan rate to scan opportunity divisor evaluates to 1.231 frames. For a specific implementation of the mobile communications system 100, at every 1.231 frames does not signal the start of a frame boundary, so the ratio is rounded up to the nearest integer larger than the ratio. Instead of 1.231, 2 is used and the scan interval evaluates to 0.64 seconds. This is the same result that is derived if the scan opportunity divisor is chosen to be 8.

TABLE 5

| Scan Opportunity Divisor | Scan Interval (sec) |
|---|---|
| 1 | 5.12 |
| 2 | 2.56 |
| 3 | 1.707 |
| 4 | 1.28 |
| 5 | 1.28 |
| 6 | 0.853 |
| 7 | 0.853 |
| 8 | 0.64 |
| 9 | 0.64 |
| 10 | 0.64 |
| 11 | 0.64 |
| 12 | 0.64 |
| 13 | 0.64 |
| 14 | 0.64 |
| 15 | 0.64 |
| 16 | 0.32 |

Figure 4:
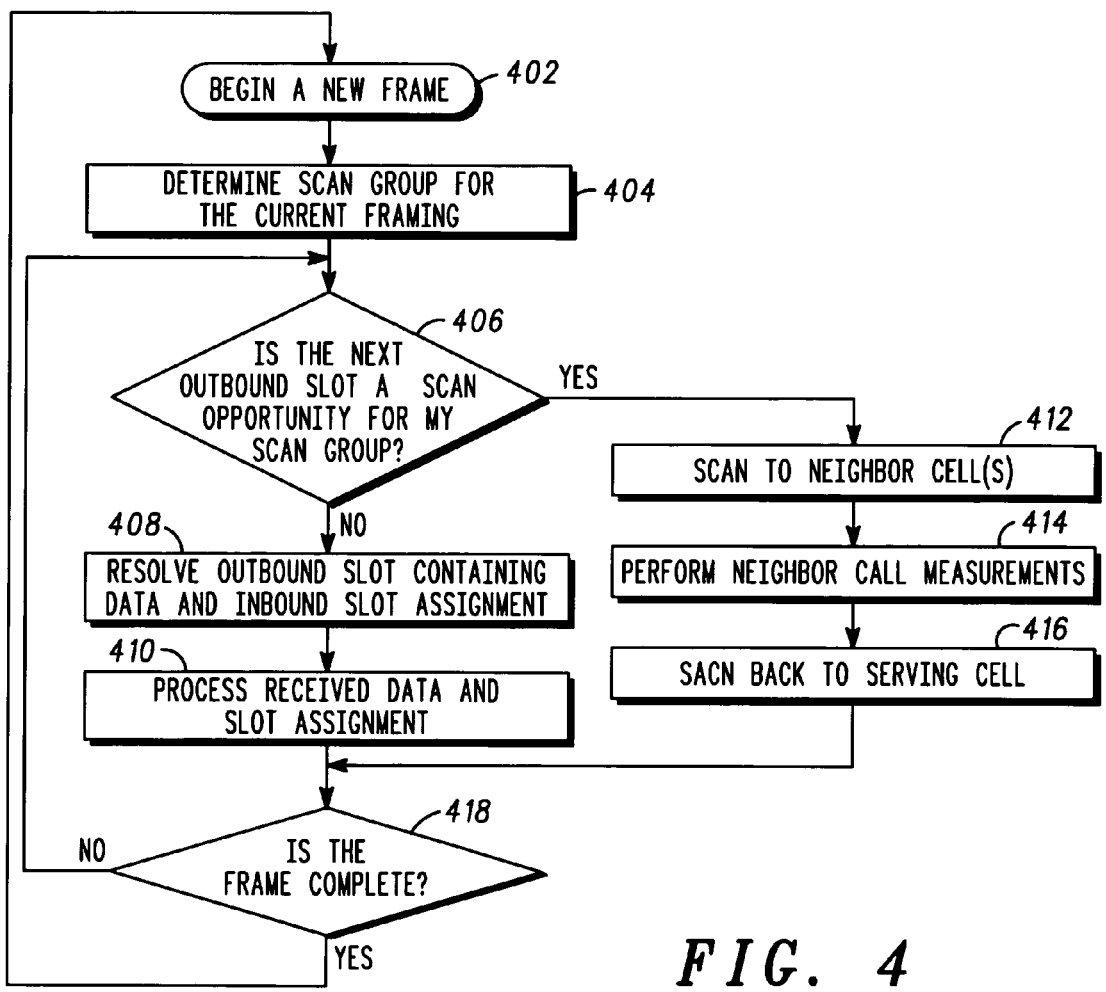
FIG. 4 is a flow diagram of an example mobile subscriber method in accordance with an embodiment of the invention.

In accordance with one embodiment of the present invention, a method for synchronizing communications between a mobile subscriber and a base station is illustrated in FIG. 4. In block 402, the mobile subscriber receives a new frame from an associated base station and begins a count of frames. Based upon the count of frames, the mobile subscriber determines whether it is a part of the scan group for the current frame (Block 404). In one embodiment, the count of frames is provided by decoding the BCCH message (Block 404). Then, the mobile subscriber makes a decision as to whether the next outbound slot is a scan opportunity for the mobile subscriber's scan group (Block 406). The decision involves evaluating Equation 2 by inputting the frame number, scan group, and scan opportunity divisor to determine whether Equation 2 evaluates to zero. If the equation evaluates to zero, then the mobile subscriber has knowledge that the current frame contains a scan opportunity and the mobile subscriber counts the number of slots until the end of the current frame. Then at the end of the current frame, the flow continues to Block 412. Otherwise, the flow continues to Block 408.

At Block 412, the mobile subscriber scans to a neighbor base station. The mobile subscriber performs cell measurements at the neighbor base station (Block 414). In block 414, the mobile subscriber may also process the received BCCH message sent from the neighboring base station, may process receive signal strength indication (RSSI), and signal quality estimation (SQE) based on noise and interference estimation of the channel. Before the end of the time slot and the end of the BCCH message, the mobile subscriber scans back to the associated base station (Block 416). The flow continues by the mobile subscriber determining whether the frame is complete (Block 418). The decision in Block 418 involves determining whether three time slots have passed since the beginning of the frame. If three time slots have passed, then the decision evaluates to "yes" and the flow continues to Block 402. Otherwise, the flow continues to Block 406.

At Block 408, the mobile subscriber receives an outbound slot containing data or an outbound slot containing a slot assignment. The mobile subscriber processes the received outbound slot (Block 410) by decoding the received data or by scheduling time that the mobile subscriber can send inbound slots to the mobile subscriber's associated base station. The flow continues by the mobile subscriber determining whether the frame is complete (Block 418). The decision in Block 418 involves determining whether three time slots have passed since the beginning of the frame. If three time slots have passed, then the decision evaluates to "yes" and the flow continues to Block 402. Otherwise, the flow continues to Block 406.

Figure 5:
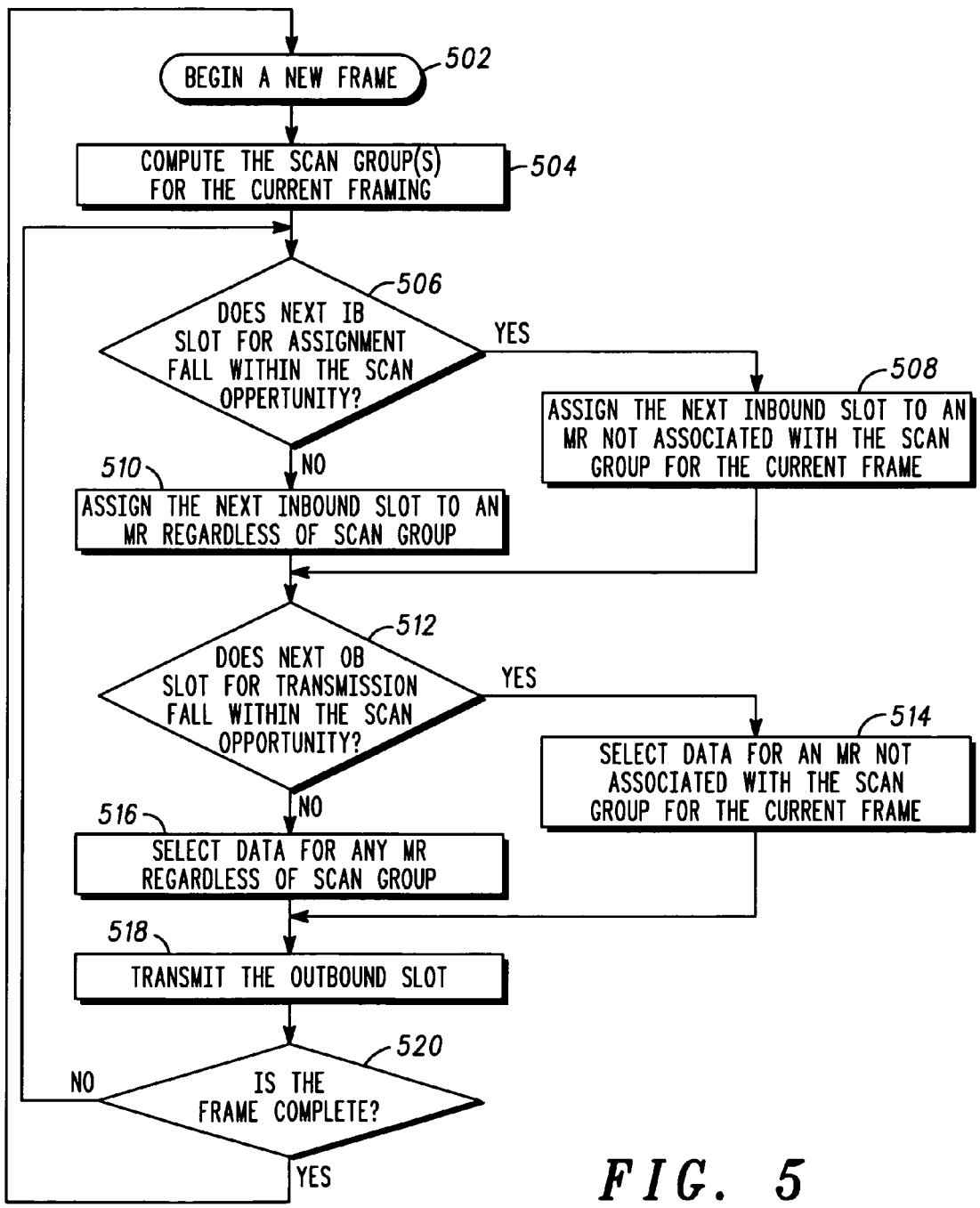
FIG. 5 is a flow diagram of an example base station method in accordance with an embodiment of the invention.

In accordance with one embodiment of the present invention, a method for synchronizing communications between a mobile subscriber and a base station is illustrated in FIG. 5. In summary, the base station determines which mobile subscriber scan groups are going to be scanning and when they are going to perform scanning, and the base station does not send mobile subscribers data or slot assignments when the mobile subscribers are performing scanning of neighboring base stations. The following examples assume that mobile subscribers 12 and 22 (as shown in FIG. 1) are not in the same scan group and that the scan group association is based upon a mapping between the mobile subscriber and a hardware identification characteristic, such as the previously described SAC. Further, references to a current frame and a next frame refer to Frame 1 and Frame 2, respectively, as shown in FIG. 2.

In block 502, the base station begins a new frame to send to a mobile subscriber. Then, the base station computes a scan group for the current frame (Block 504). Computing a scan group involves evaluating Equation 2 to determine which scan group has a scan opportunity based upon various scan group values, the frame value and scan opportunity divisor. Namely, the base station determines what values of the scan group cause Equation 2 to evaluate to zero.

The decision in Block 506 involves determining whether the next inbound time slot is a scan opportunity. For example, for inbound time slot 1, the decision evaluates to 'no.' If the decision evaluates to 'no,' then the flow continues to Block 510. Otherwise, the flow continues to Block 508. In Block 510, the base station sends a slot assignment to any mobile subscriber associated with the base station regardless of the scan group that the mobile subscriber is a part of (Block 510). In other words, as shown in FIG. 2, Block 510 is concerned with shaded slots as shaded slots are scan opportunities. As long as the base station has not encountered an inbound time slot that is shaded, the base station can assign the time slot to any mobile subscriber regardless of the scan group that the mobile subscriber is a part of because the base station has knowledge that the mobile subscriber should not be scanning during the time slot and can send data to the base station (Block 510).

If the base station has encountered an inbound time slot that is shaded, then the base station knows that mobile subscribers of the current scan group are unavailable and are scanning neighboring base stations, so the base station assigns the next inbound slot to a mobile subscriber not a part of the current scan group (Block 508). For example, if a given time slot is a scan opportunity for mobile subscriber 12, then base station 9 assigns a scan opportunity to mobile subscriber 12. Because it is a scan opportunity for mobile subscriber 12, base station 9 can send data or slot assignments to other mobile subscribers not associated with the scan group that mobile subscriber 12 is a part of, e.g. mobile subscriber 22 which is a part of scan group 2.

Whether the decision in Block 506 evaluates to a scan opportunity or not, once processing of the inbound slot is completed (Blocks 508, 510), flow continues to Block 512 and determining whether the next outbound slot to be transmitted is a scan opportunity. Continuing with our example, the question asked is whether outbound slot 2 is shaded? If the outbound slot is not shaded, flow continues to Block 516. For the case of outbound slot 2, since outbound slot 2 is not shaded, the base station can send data to any particular subscriber that the base station wants to. For example, the base station can send data to mobile subscriber 1 and a slot assignment to mobile subscriber 2 in the same outbound slot 2. In this particular case, we can send data in outbound slot 2 to mobile subscriber 1 and we can assign inbound slot 2 to mobile subscriber 2. Flow continues to Block 518 where the outbound slot is transmitted. Then, the base station checks to see whether the frame is complete (Block 520). Since it takes three frames to make a single frame and the base station has processed two time slots, the frame is not complete and flow continues to Block 506 and processing continues for outbound time slot 3.

Returning to whether the next outbound slot to be transmitted is a scan opportunity (block 512), if the decision evaluates to 'yes,' then flow continues to Block 514 where the base station selects data for a mobile subscriber that is not associated with the scan group for the current frame (Block 514). Then transmit the outbound slot (block 518). The base station checks to see that transmission occurred and whether the frame is complete (block 520). Since it takes three time slots to make a single frame and the base station has processed two time slots, the frame is not complete and flow continues to Block 506 and processing continues for outbound time slot 3.

Processing continues at Block 506. Does time slot 4 fall within the scan opportunity, e.g. is inbound time slot 4 shaded (Block 506)? Yes, inbound time slot 4 is shaded. Processing continues to Block 508. Assign the time slot to mobile subscriber 2 (but not mobile subscriber 1) and we go to block 512. The base station determines whether the next outbound time slot OB slot fall within the scan opportunity (block 512)? In our example, that is outbound time slot 4. Since outbound time slot 4 is shaded, the decision evaluates to 'yes,' and flow continues to Block 514. The base station selects for a mobile subscriber not associated with the scan group for the current frame (block 514) and send data in time slot 4 to any mobile subscriber other than a mobile subscriber in scan group 1. The base station can send a slot assignment and/or data to any mobile subscriber that is not in scan group 1 (block 514). Then processing continues to Block 518 where the base station transmits the outbound time slot. Then, the base station checks to see whether the frame is complete in Block 520. Since the frame is complete, flow continues to Block 502 where a new frame is started.

To summarize, the system and method of the present invention provides a number of benefits. First, it provides synchronization between a base station and a mobile subscriber of a communications system 100. A base station in the communications system 100 knows when a mobile subscriber will not be associated with the base station. By knowing when a mobile subscriber is not available, the base station does not send data and/or slot assignments to the unavailable mobile subscriber so that time slots are utilized more efficiently. Such a synchronization mechanism utilizes the communication throughput beneficially.

Second, the present invention provides flexibility for when a mobile subscriber can scan neighboring base stations whereas the prior art allows for periodic time periods where the mobile subscriber may not be available, e.g. every fifth time slot. Such flexibility further provides that a mobile subscriber not have knowledge a prior as to whether data is coming to it or not. For example, a mobile subscriber receiving data in time slot 1 has no indication of when it will receive data again. The mobile subscriber may receive data in time slot 2 or it may not. In one embodiment, when the mobile subscriber next receives data is dependent upon when the base station sends data which is dependent upon the base station's evaluation of Equation 2.

Third, aspects of the invention are directed to facilitating rapid and seamless handovers of mobile subscribers from one base station to another. By allowing a mobile subscriber to take scan opportunities during time slots that can be used for data, slot assignments, or for scanning, the mobile subscriber is able to maintain up to date neighboring base station information without impacting the transfer of data between the mobile subscriber and the associated base station.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the mobile subscriber and/or the base subscriber may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method for synchronizing scan opportunities in a mobile communications system comprising the steps of:
    sending time slots between a mobile subscriber and an associated base station wherein the mobile subscriber has a corresponding scan group;
    counting the number of time slots sent between the mobile subscriber and the associated base station; and
    determining whether it is a scan opportunity based upon the count, the scan group of the mobile subscriber, a scan rate, and a scan opportunity divisor and if it is a scan opportunity, then performing a scan of a neighboring base station.

2. The method of claim 1 wherein the count is associated with a number of frames where one frame is a plurality of time slots.

3. The method of claim 1 where the step of performing a scan is performed by the mobile subscriber.

4. The method of claim 1 wherein the scan rate is a number of scan groups in the mobile communications system.

5. The method of claim 1 where the scan group is based upon the characteristics of the mobile subscribers of the mobile communications system.

6. The method of claim 1 where the step of determining further comprises evaluating the following equation for the scan opportunity $$|Count - Scan\ Group|\ \%\ \frac{Scan\ Variable}{Scan\ Opportunity\ Divisor}.$$

7. The method of claim 1 wherein the scan group of the mobile subscriber is based upon a subscriber access code.

8. The method of claim 1 wherein the scan group is a grouping of mobile subscribers requiring a similar scan time.

9. The method of claim 8 wherein the grouping is based upon characteristics of the mobile subscribers including hardware and software of the mobile subscriber.

10. A system for synchronizing scan opportunities in a mobile communications system comprising:
    an associated base station configured to keep a first count of a number of time slots sent between the base station and a mobile subscriber;
    the mobile subscriber configured to receive communications from the associated base station and configured to keep a second count of a number of time slots sent between the base station and the mobile subscriber;
    a processor for determining a scan opportunity based upon the first count and the second count, a scan group of the mobile subscriber, a scan rate, and a scan opportunity divisor, wherein
    the mobile subscriber scans to a neighboring base station on a scan opportunity.

11. The system of claim 10 wherein the first count and the second count are associated with a number of frames where one frame is a plurality of time slots.

12. The system of claim 10 where the processor evaluates the following equation for the scan opportunity $$|Count - Scan\ Group|\ \%\ \frac{Scan\ Variable}{Scan\ Opportunity\ Divisor}.$$

13. The system of claim 10 wherein the scan group of the mobile subscriber is based upon a subscriber access code.

14. The system claim 10 wherein the scan group is a grouping of mobile subscribers requiring a similar scan time.

15. The system of claim 14 wherein the grouping is based upon characteristics of the mobile subscribers including hardware and software of the mobile subscriber.

16. A system for synchronizing scan opportunities in a mobile communications system comprising:
    means for sending time slots between a mobile subscriber and an associated base station wherein the mobile subscriber has a corresponding scan group;
    means for counting the number of time slots sent between the mobile subscriber and the associated base station; and
    means for determining whether it is a scan opportunity based upon the count of frames, the scan group of the mobile subscriber, a scan rate, and a scan opportunity divisor.

17. The system of claim 16 wherein the count is associated with a number of frames where one frame is a plurality of time slots.

18. The system of claim 16 where the means for determining evaluates the following equation for the scan opportunity $$|Count - Scan\ Group|\ \%\ \frac{Scan\ Variable}{Scan\ Opportunity\ Divisor}.$$

19. The system of claim 16 wherein the scan group of the mobile subscriber is based upon a subscriber access code.

20. The system of claim 16 wherein the scan group is a grouping of mobile subscribers requiring a similar scan time.

* * * * *